W. B. Heintze,
Meat Cutter.
No. 100,035.  Patented Feb. 22, 1870.
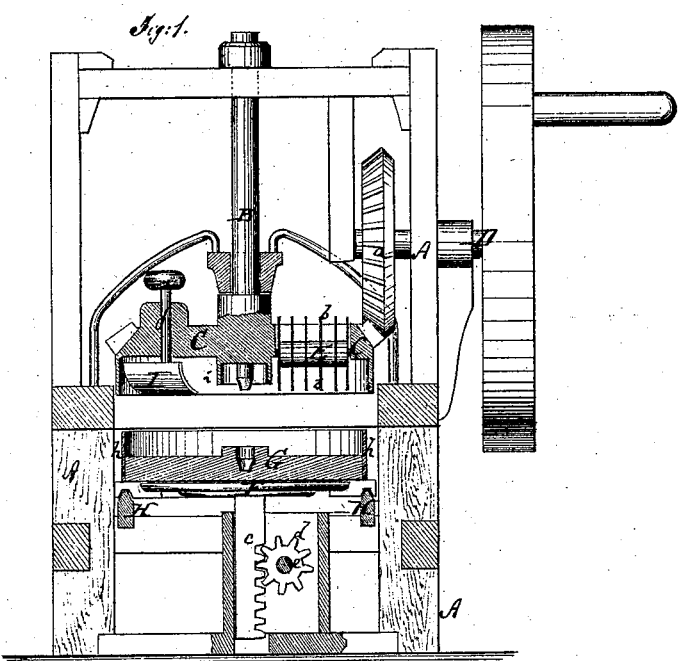
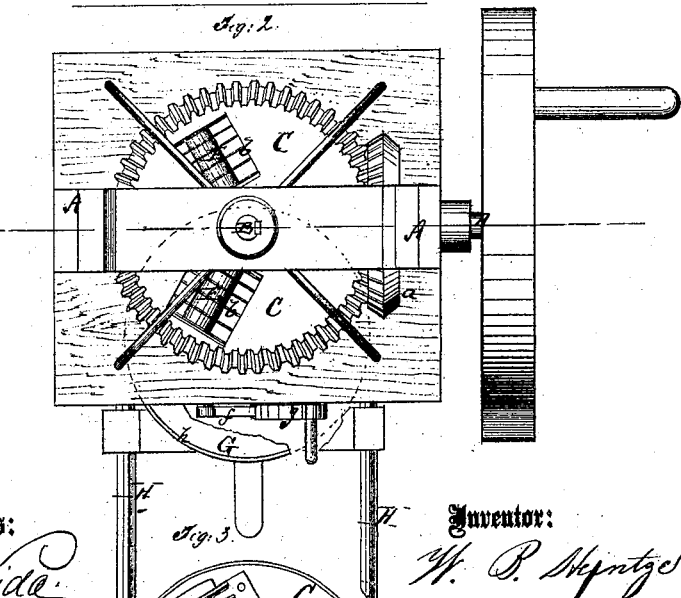
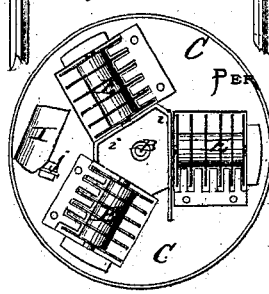
Witnesses:  Inventor:

United States Patent Office.

WILLIAM B. HEINTZE, OF WILLIAMSBURG, NEW YORK.

Letters Patent No. 100,035, dated February 22, 1870.

IMPROVED MEAT-CUTTER

The Schedule referred to in these Letters Patent and making part of the same.

*To all whom it may concern:*

Be it known that I, WILLIAM B. HEINTZE, of Williamsburg, in the county of Kings, and State of New York, have invented a new and improved Meat-Cutter; and I do hereby declare that the following is a full, clear, and exact description thereof, which will enable others skilled in the art to make and use the same, reference being had to the accompanying drawings forming part of this specification, in which—

Figure 1 represents a side elevation, partly in section, of my improved meat-cutter.

Figure 2 is a plan or top view of the same.

Figure 3 is an inverted plan view of the cutting disk.

Similar letters of reference indicate corresponding parts.

This invention relates to a new machine for cutting meat into small pieces, and consists chiefly in the employment of rotary cutters hung upon axles that are secured in a rotary disk, and also in the use of a vertically-adjustable bed or support for the meat to be cut.

The invention also consists in the use of scrapers for turning and displacing the meat on the bed.

A in the drawing represents the frame of my improved meat-cutting machine. In the same are the bearings of a vertical shaft, B, which at its lower end carries a disk or plate, C, that has teeth on its outer edge meshing into those of a pinion, a.

The pinion is mounted upon a horizontal driving-shaft, D, which is hung in the frame above the bed C.

Rotary motion is imparted to the shaft D by suitable means, so as thereby to revolve the shaft B and disk C. Such motion may, if desired, be applied directly to the shaft B.

The disk C has three (more or less) slots, and in them it contains horizontal shafts E E, which radiate from the center of the disk, and which carry annular knives *b b*, as shown.

Under the disk is arranged in the frame a vertically-adjustable plate, F, which is supported by a rack, *c*, that is held in place by a pinion, *d*, on a shaft, *e*.

G is the bed of the cutting apparatus. It is placed upon rails, H, that project from the side of the machine, and is on the same moved under the plate C. The plate F is then elevated toward the bed, and raises the same against the plate C. The meat on the bed G will, by the action of the revolving knives, be cut to the requisite degree of fineness.

By adjusting the bed vertically, by means of the rack and pinion, the meat can be cut more or less fine.

A pawl, *f*, fitting against the teeth of a ratchet-wheel, *g*, which is mounted on the shaft *e*, locks the bed at the desired height.

The bed G carries an upward-projecting flange, *h*, which, in closing against the under side of the disk C, confines the meat in the proper place under the cutters.

To the under side of the disk C is secured a spiral plate, *i*, which, as it is being revolved, throws the meat outwardly, and brings it under the cutters.

A scraper, I, is secured to a pin, *j*, which is fitted through the disk C, and is plow-shaped or curved, as shown, to turn over the meat on the bed. By means of the pin *j* the scraper can be vertically adjusted.

Having thus described my invention,

I claim as new, and desire to secure by Letters Patent—

The combination of toothed and slotted disk C on vertical shaft B, pinion *a* on horizontal shaft D, the annular knives *b* on shafts E E, the plate F held in place by rack and pinion *c d* on shaft *e*, and the bed G, placed upon rails H, with the scraper I, all constructed and arranged as set forth.

WILLIAM B. HEINTZE.

Witnesses:
A. V. BREISEN,
E. MARTIN.